United States Patent
Thakor

(10) Patent No.: US 6,959,329 B2
(45) Date of Patent: Oct. 25, 2005

(54) SYSTEM AND METHOD FOR TRANSFORMING CONFIGURATION COMMANDS

(75) Inventor: Sanjiv Thakor, Colorado Springs, CO (US)

(73) Assignee: Intelliden, Colorado Springs, CO (US)

(*) Notice: Subject to any disclaimer, the term of this patent is extended or adjusted under 35 U.S.C. 154(b) by 405 days.

(21) Appl. No.: 10/145,868

(22) Filed: May 15, 2002

(65) Prior Publication Data

US 2003/0220986 A1 Nov. 27, 2003

(51) Int. Cl.$^7$ .............................................. G06F 15/16
(52) U.S. Cl. ........................... 709/220; 709/222; 713/2
(58) Field of Search ................................. 709/220, 222; 713/2

(56) References Cited

U.S. PATENT DOCUMENTS

| | | |
|---|---|---|
| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,519,704 A | 5/1996 | Farinacci et al. |
| 5,557,748 A | 9/1996 | Noris |
| 5,581,764 A | 12/1996 | Fitzgerald et al. |
| 5,724,509 A | 3/1998 | Starkweather et al. |
| 5,726,883 A | 3/1998 | Levine et al. |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |
| 5,819,028 A | 10/1998 | Manghirmalani et al. |
| 5,832,503 A * | 11/1998 | Malik et al. ................ 709/223 |
| 5,838,918 A | 11/1998 | Prager et al. |
| 5,842,040 A | 11/1998 | Hughes et al. |

(Continued)

FOREIGN PATENT DOCUMENTS

| | | |
|---|---|---|
| EP | 0 384 339 A2 | 8/1990 |
| EP | 0 810 755 A2 | 12/1997 |
| EP | 0 762 281 A3 | 3/1999 |
| EP | 0 973 296 A2 | 1/2000 |
| EP | 0 993 725 A1 | 4/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 11/2000 |
| EP | 1 090 492 A1 | 4/2001 |

(Continued)

OTHER PUBLICATIONS

Lonvick, C. The BSD syslog Protocol. RFC 3164 [online], Aug. 2001 [retrieved on Mar. 25, 2002]. Retrieved from the Internet, <url://www.jetf.org/rfc/rfc3164.txt>.

(Continued)

*Primary Examiner*—Viet D. Vu
*Assistant Examiner*—Jinsong Hu
(74) *Attorney, Agent, or Firm*—Cooley Godward LLP

(57) ABSTRACT

A system and method for generating network device-specific configuration commands from device-neutral configuration commands is described. To generate a device-specific configuration command from a device-neutral configuration command, the described device, in one embodiment, determines a target network device's characteristics. Using that characteristic data, a lookup key is generated for the code that is being converted from a device-neutral format to a device-specific format. That lookup key can be used to access a configuration schema and to locate the information necessary for converting the command to a device-specific format. Using the configuration schema, the device-specific configuration command can be generated.

21 Claims, 6 Drawing Sheets

U.S. PATENT DOCUMENTS

| | | |
|---|---|---|
| 5,852,740 A | 12/1998 | Estes |
| 5,872,928 A | 2/1999 | Lewis et al. |
| 5,884,028 A | 3/1999 | Kindell et al. |
| 5,889,953 A | 3/1999 | Thebaut et al. |
| 5,920,701 A | 7/1999 | Miller et al. |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |
| 5,980,078 A | 11/1999 | Krivoshein et al. |
| 6,006,035 A | 12/1999 | Nabahi |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fujui |
| 6,154,776 A | 11/2000 | Martin |
| 6,167,445 A | 12/2000 | Gai et al. |
| 6,170,009 B1 | 1/2001 | Mandal et al. |
| 6,170,011 B1 | 1/2001 | Macleod Beck et al. |
| 6,182,094 B1 | 1/2001 | Humpleman et al. |
| 6,198,479 B1 | 3/2001 | Humpleman et al. |
| 6,202,090 B1 | 3/2001 | Simone |
| 6,243,747 B1 | 6/2001 | Lewis et al. |
| 6,260,072 B1 | 7/2001 | Rodriguez-Moral |
| 6,269,398 B1 | 7/2001 | Leong et al. |
| 6,292,889 B1 | 9/2001 | Fitzgerald et al. |
| 6,349,306 B1 | 2/2002 | Malik et al. |
| 6,356,955 B1 | 3/2002 | Hollberg et al. |
| 6,363,411 B1 | 3/2002 | Dugan et al. |
| 6,370,119 B1 | 4/2002 | Basso et al. |
| 6,381,631 B1 | 4/2002 | Van Hoff |
| 6,393,425 B1 | 5/2002 | Kelly |
| 6,418,468 B1 | 7/2002 | Ahlstrom et al. |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,463,583 B1 | 10/2002 | Hammond |
| 6,496,843 B1 | 12/2002 | Getchius et al. |
| 6,539,425 B1 | 3/2003 | Stevens et al. |
| 6,550,060 B1 | 4/2003 | Hammond |
| 6,567,406 B1 | 5/2003 | Skemer |
| 6,609,108 B1 | 8/2003 | Pulliam et al. |
| 6,615,166 B1 | 9/2003 | Guheen et al. |
| 6,625,590 B1 | 9/2003 | Chen et al. |
| 6,636,877 B1 | 10/2003 | Doleac et al. |
| 6,643,640 B1 | 11/2003 | Getchius et al. |
| 6,654,799 B1 | 11/2003 | Tanaka |
| 6,658,526 B2 | 12/2003 | Nguyen et al. |
| 6,678,827 B1 | 1/2004 | Rothermel et al. |
| 6,684,244 B1 | 1/2004 | Goldman et al. |
| 6,697,967 B1 | 2/2004 | Robertson |
| 6,725,233 B2 | 4/2004 | Froyd et al. |
| 6,769,116 B1 | 7/2004 | Sexton |
| 6,775,698 B1 | 8/2004 | Simone |
| 6,826,597 B1 * | 11/2004 | Lonnroth et al. ........... 709/207 |
| 2002/0032769 A1 | 3/2002 | Barkai et al. |
| 2002/0038320 A1 | 3/2002 | Brook |
| 2002/0051080 A1 | 5/2002 | Tanaka |
| 2002/0161863 A1 * | 10/2002 | McGuire |
| 2002/0171762 A1 | 11/2002 | Maxson et al. |
| 2002/0174091 A1 | 11/2002 | Froyd et al. |
| 2002/0191619 A1 | 12/2002 | Shafer |
| 2002/0198974 A1 | 12/2002 | Shafer |
| 2003/0033589 A1 | 2/2003 | Reyna et al. |
| 2003/0037040 A1 | 2/2003 | Beadles et al. |
| 2003/0048287 A1 | 3/2003 | Little et al. |
| 2003/0135508 A1 | 7/2003 | Chorafakis et al. |
| 2003/0158894 A1 * | 8/2003 | Ziserman |
| 2004/0078695 A1 | 4/2004 | Bowers et al. |
| 2004/0225865 A1 | 11/2004 | Cox et al. |

FOREIGN PATENT DOCUMENTS

| | | |
|---|---|---|
| EP | 1 091 526 A2 | 4/2001 |
| GB | 2 368 692 A | 5/2002 |
| WO | WO 95/08794 | 3/1995 |
| WO | WO 95/24802 A | 9/1995 |
| WO | WO 97/49214 | 12/1997 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01-01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

Case, J., A Simple Network Management Protocol (SNMP). RFC 1098 [online], Apr. 1989 [retrieved on Mar. 26, 2002]. Retrieved from the internet <URL://www.jetf.org/rfc/rfc1098.txt?number=1098>.

Postel, J.B. Simple Mail Transfer Protocol. RFC 821 [online], Aug. 1982 [retrieved on Mar. 26, 2002]. Retrieved from the Internet <URL://www.ieft.org/rfc/rfc0821.txt?number=821>.

Finseth, C. An Access Control Protocol, Sometimes called TACACS. RFC 1492 [online], Jul. 1993 [retrieved on Mar. 25, 2002]. Retrieved from the Internet <URL://www.cis.ohio-state.edu/cgi-bin/rfc/rfc1492.html>.

Anderson, B.A. TACACS User Identification Telnet Option. RFC 927 [online], Dec. 1984 [retrieved on Mar. 25, 2002]. Retrieved from the Internet <URL://www.jetf.org/rfc/rfc0927.txt>.

Rigney, C., et al. Remote Authentication Dial In User Service (RADIUS). RFC 2138 [online], Apr. 1997 retrieved on Mar. 25, 2002. Retrieved from the Internet <URL://www.ietf.org.rfc/rfc2138.txt>.

Rigney, C., RADIUS Accounting. RFC 2139 [online], Apr. 1997 [retrieved on Mar. 25, 2002]. Retrieved from the Internet <URL://www.ietf.org/rfc/rfc2139.txt>.

Postel, J., and Reynolds, J. Telnet Protocol Specification. RFC 854 [online], May 1983 [retrieved on Mar. 25, 2002]. Retrieved from the Internet <URL://www.ietf.org/rfc/rfc0854.txt>.

Gold Wire Technology, "Tracking Changes," In *Formulator 1.0 User Guide*, pp. 211–224, Jan., 2001.

Lewis, L, *"Policy–Based Configuration Management: A Perspective from a Network Management Vendor,"* www.simple–times.org/pub/simple–times/issues/8.1.html., pp. 7–27, Sep., 2000.

Waldbusser, St., et al., "Policy Based Management MIB," www.ietf.org/internet–drafts/draft–ietf–snmpconf–pm–05.txt, pp. 1–102, Mar. 1, 2001.

Strassner, J., *A New Paradigm for Network Management: Business Deriven Device Management*,[online], 2002, www.ssgrr.it/en/ssgrr2002s/papers.htm,http://www.ssgrr.it/en/ssgrr2002s/papers/162.pdf.

Managing Managed Network Services: The Service Provider Blind Spot; Infonetics Research, The Networking Information Source; Jun. 2000 (18 pages).

ISM Customer—Aware™Query; CoManage Corporation; As of Dec. 5, 2000 (2 pages).

ISM Customer—Aware™ Provisioning; CoManage Corporation; As of Dec. 5, 2000 (2 pages).

ISM Customer—Aware™ Deep Discovery™; CoManage Corporation; As of Dec. 5, 2000 (2 pages).

ISM Customer—Aware™ Service Profiling; CoManage Corporation; As of Dec. 5, 2000 (2 pages).

ISM Customer—Aware™ Fault and Performance Management; CoManage Corporation; As of Dec. 5, 2000 (2 pages).

Strassner, John; Technology Series—*Directory Enabled Networks*, 1999; MacMillan Technical Publishing USA.

"FFST/2 Generic Alert Router for LAN and SNA Transports," IBM Technical Disclosure Bulletin, IBM Corp. New York, US, vol. 34, No. 11, Apr. 1, 1992, pp. 467–468, XP000303331, ISSN: 0018–8689.

Torrente S et al: "Implementation of the ANSI TIM 1.5 GBM–TI 214 within an ODBMS framework" Networking: Foundation for the Future, San Francisco, Mar. 28–Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875–884, XP010032227, ISBN: 0–8186–3580–0.

Kennedy T W: "Network Operations & Management Tool Requirements for the 90s" Proceedings of the Network Operations and Management Symposium (NOMS), Memphis, Apr. 6–9, 1992, New York, IEEE, U.S. Vo. 1, 1992, pp. 122–132.

Lee, W.C. et al: "Routing Subject to Quality of Service Constraints in Integrated Communication Networks" IEEE Network, IEEE Inc. New York, US, vol. 9, No. 4, Jul. 1, 1995 (1995–07–01), pp. 46–55, XP000526591, ISSN: 0890–8044 the whole document.

Williams R: "Web Based Enterprise Management W101" DMTF 1999 Annual Conference, 'Online! Jun. 15–16, 1999, pp. 1–21.

Wolfson, Ouri et al.: "Managing Communication Networks by Monitoring Database", IEEE Transactions on Software Engineering, IEEE Inc. New York, US, vol. 17, No. 9 Sep. 1, 1991, pp. 944–953.

PCT/US 01/45668–International Search Report dated Oct. 16, 2002.

PCT/US 01/45669–International Search Report dated Oct. 16, 2002.

PCT/US 01/45671–International Search Report dated Oct. 16, 2002.

PCT/US 01/45670–International Search Report dated Dec 20, 2002.

PCT/US 01/45672–International Search Report dated Apr. 14, 2003.

PCT/US 01/45671–Written Opionion dated Dec. 13, 2002.

* cited by examiner

SYSTEM AND METHOD FOR TRANSFORMING CONFIGURATION COMMANDS

RELATED APPLICATIONS

The present application is related to commonly owned and assigned application Nos.:

pending Ser. No. 09/730,864, entitled System and Method for Configuration, Management and Monitoring of Network Resources, filed Dec. 6, 2000;

pending Ser. No. 09/730,680, entitled System and Method for Redirecting Data Generated by Network Devices, filed Dec. 6, 2000;

pending Ser. No. 09/730,863, entitled Event Manager for Network Operating System, filed Dec. 6, 2000;

pending Ser. No. 09/730,671, entitled Dynamic Configuration of Network Devices to Enable Data Transfers, filed Dec. 6, 2000;

pending Ser. No. 09/730,682, entitled Network Operating System Data Directory, filed Dec. 6, 2000;

pending Ser. No. 09/799,579, entitled Global GUI Interface for Network OS, filed Mar. 6, 2001;

pending Ser. No. 09/942,834, entitled System and Method for Generating a Configuration Schema, filed Aug. 29, 2001, and pending Ser. No. 09/942,833, entitled System and Method for Modeling a Network Device's Configuration, filed Aug. 29, 2001 (the "'833 Application"), all of which are incorporated herein by reference.

FIELD OF THE INVENTION

The present invention relates to network device configuration. In particular, but not by way of limitation, the present invention relates to systems and methods for generating device-specific configuration commands from device-neutral configuration code.

BACKGROUND OF THE INVENTION

Networks, and in particular, the Internet, have revolutionized communications. Data vital to the continued prosperity of the world economy is constantly being exchanged between end-users over these networks. Unfortunately, the expansion and maintenance of present networks is outpaced by the demand for additional bandwidth. Network equipment is often difficult to configure, and qualified network engineers are in extremely short supply. Thus, many needed network expansions and upgrades must be delayed until these engineers are available. While these upgrades and expansions are pending, end-users continue to suffer poor network performance.

Cisco™ routers, for example, are notoriously difficult to configure—especially in light of the new XML-based interfaces introduced by competitors such as Juniper Networks™. Instead of a user-friendly XML-based interface, Cisco uses a cumbersome command line interface (CLI) for its routers. Cisco's CLI is the result of many years of semi-controlled modifications to its router operating systems and has resulted in a tangled mess of commands and subcommands. This cumbersome interface is one reason that Cisco requires that Cisco-certified engineers work on its routers.

Cisco could reduce the complexity of its routers and reduce the need for Cisco-certified engineers by producing a user-friendly interface. If Cisco attempted to abandon its CLI in favor of such a user-friendly interface, however, many years of development and expertise could be lost. Moreover, even if it could develop a user-friendly interface, there is presently no economical way to integrate it into the thousands of existing Cisco routers.

Despite the difficulties in implementing a more user-friendly interface, to remain competitive, Cisco and similarly situated companies need to move away from their present interfaces. Present technology, however, does not provide these companies with an acceptable option that allows continued use of their extensive interface knowledge base, whether it be CLI or some other type of interface, while simultaneously providing system administrators and network engineers with a user-friendly interface. Moreover, present technologies do not provide an acceptable way to provide backward compatibility of new user-friendly interfaces with existing network devices.

Cisco, of course, is not the only network device manufacturer to face this interface-upgrade problem. Many manufacturers would like to continue using their existing interface knowledge base while providing system administrators a user-friendly interface that is consistent across multiple platforms. Accordingly, a system and method are needed that will allow manufacturers, like Cisco, to create user-friendly interfaces for both next-generation and existing devices.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In commonly owned and assigned application Ser. No. 09/942,833, entitled System and Method for Modeling a Network Device's Configuration, a system and method for modeling a network device's configuration is described. Briefly, the '833 Application discloses a device and method for generating a device-neutral configuration from a device-specific configuration. For example, the '833 Application discloses a system and method for converting a set of CLI configuration commands into an XML document or into DOM representation of those configuration commands.

The present invention, in one embodiment, can provide, among other things, a complimentary system and method to that disclosed in the '833 Application. The present invention, for example, can include a system and method for generating a device-specific configuration command from a device-neutral configuration code, which can include individual commands or sets of commands. One embodiment can generate CLI commands from an XML document or DOM representation containing configuration instructions. Other embodiments can generate device-specific XML-based commands from a generic XML-based command. Notably, embodiments of the present invention can operate separately from those systems and methods described in the '833 Application.

To generate a device-specific configuration command from a device-neutral configuration command, the present invention, in one embodiment, initially determines a target network device's characteristics, e.g., device type, vendor, device manufacturer, device model, operating system (OS) version, etc. Using the characteristic data for the target device, a lookup key is generated for the command that is being converted from a device-neutral format to a device-specific format. That lookup key can be used to access a configuration schema, or some representation of that schema, and to locate the information necessary for converting the command to a device-specific format. In some embodiments, the lookup key is used to access a schema hash table that contains pointers to corresponding schema objects, which contain the information necessary for the conversion. In one embodiment, the conversion from a device-neutral format to a device-specific format involves a process that performs the conversion at run time. This process uses the schema objects as the grammar for the device specific language syntax.

In either embodiment, however, the schema information is used to parse out individual device-specific commands in the device-neutral code. The device-neutral code often can contain numerous individual device-specific commands. The information retrieved from the schema aids in identifying where one device-specific command within the device-neutral code begins and where another ends.

After the individual commands have been identified, any device-specific rules can be applied, if necessary. These device-specific rules are generally not contained in the schema and may be unique to individual devices. Device-specific rules can include, for example, rules for handling super commands.

Once the device-neutral code has been parsed to identify the individual device-specific commands therein and/or the device-specific rules have been applied, the device-specific commands can be assembled and the corresponding piece of device-neutral code marked as completed. When all of the relevant device-neutral code has been converted to a device-specific format, all of the assembled device-specific commands can be grouped and delivered to the target device.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
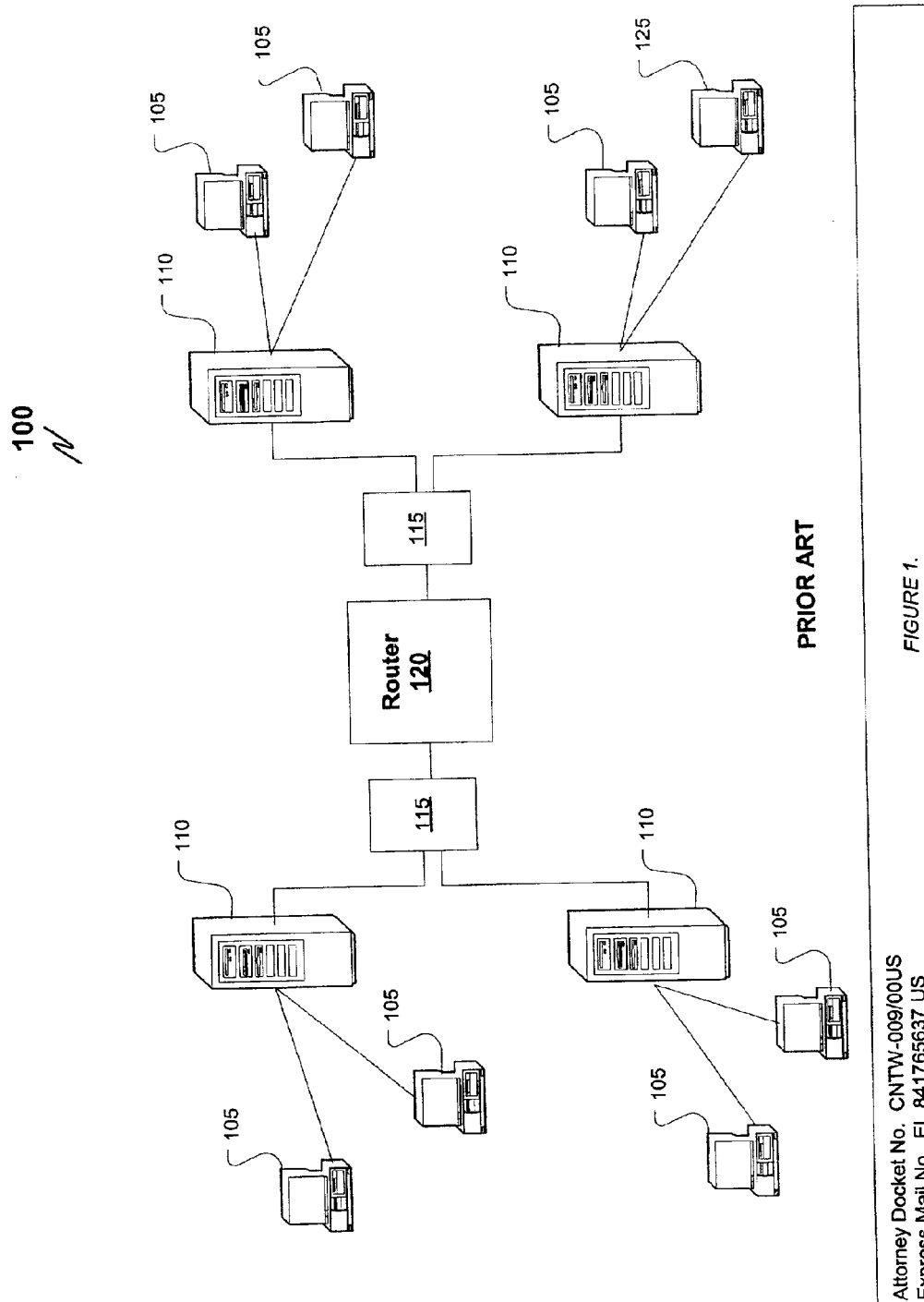
FIG. 1 is a block diagram of a conventional network.

Referring now to the drawings, where like or similar elements are designated with identical reference numerals throughout the several views, and referring in particular to FIG. 1, it illustrates a block diagram of a conventional network system 100. In this network system 100, end-users 105 are connected to servers 110, which are connected to networking equipment such as hubs, not shown, optical components 115, and routers 120. Using the networking equipment, end-users 105 that are associated with different servers 110 can exchange data.

As new servers 110 and end-users 105 are added to the overall system 100, or as new software becomes available, the routers 120 and/or optical components 115 of the network system 100 may need reconfiguring. To reconfigure these components, a system administrator 125—with the proper authorization—could access the router 120 and/or optical component 115 by, for example, establishing a telnet connection to the component and transferring configuration instructions thereto.

Figure 2:
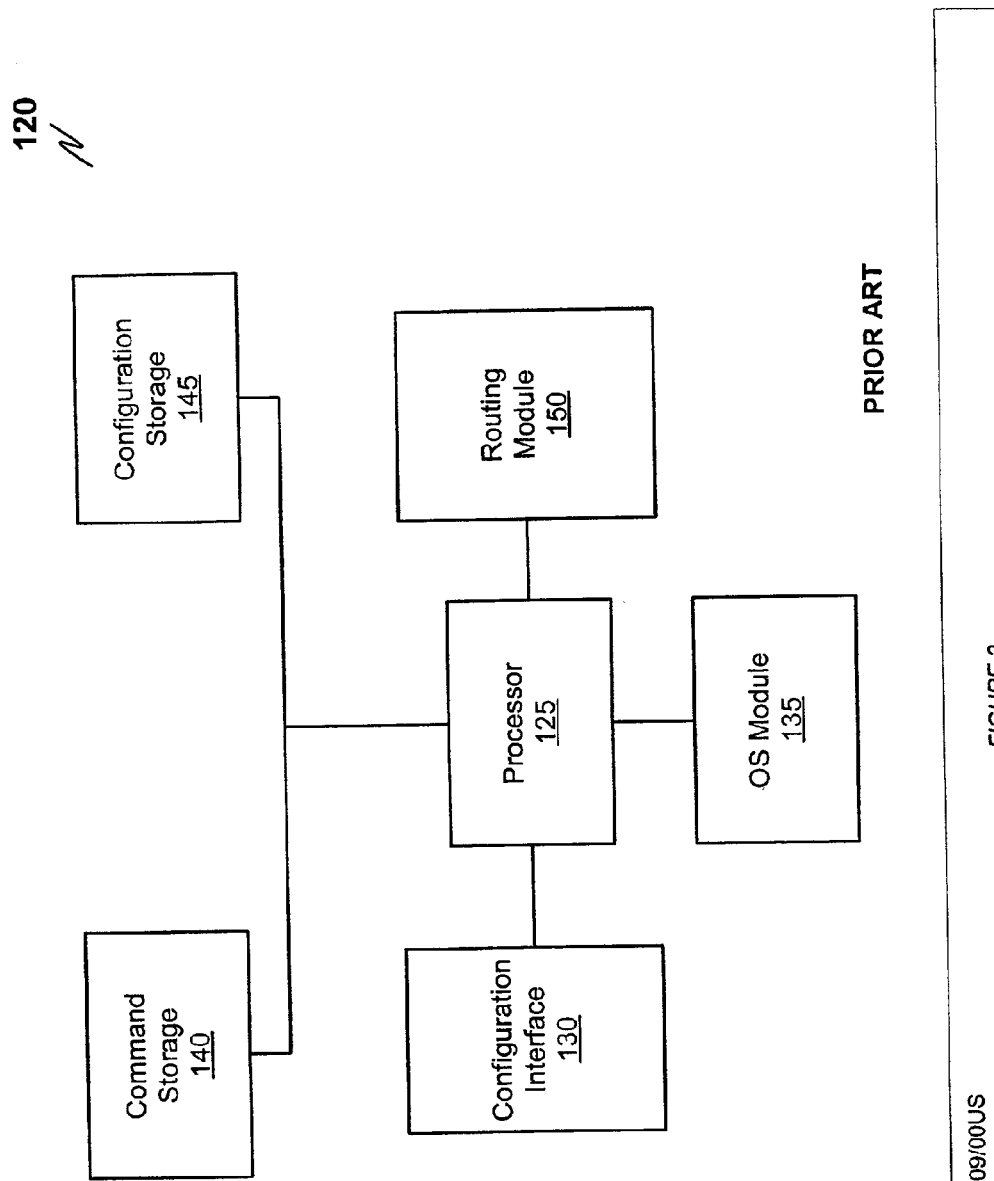
FIG. 2 is a block diagram of a conventional router.

Referring now to FIG. 2, it is a block diagram of one type of conventional router. In this representation, a processor 125 is connected to a configuration interface 130, an operating system (OS) storage module 135, a command storage module 140, a configuration storage module 145, and a routing module 150. The illustrated arrangement of these components is logical and not meant to be an actual hardware diagram. Thus, the components can be combined or further separated in an actual implementation. Moreover, the construction of each individual component is well-known to those of skill in the art.

Still referring to FIG. 2, when a system administrator 125 wishes to reconfigure a router 120, he accesses the router 120 through the configuration interface 130 and retrieves the present configuration for the router 120 from the configuration storage module 145. If necessary, the system administrator 125 can review available configuration commands and associated bounds by accessing and reviewing the commands stored in the command storage module 140. In essence, the command storage module 140 provides the knowledge base for a "help" screen. The commands stored in the command storage module 140 are often unique to the particular OS version stored in the OS module 135.

After the system administrator 125 has assembled the new configuration instructions, these instructions are pushed through the configuration interface 130 and stored in the configuration storage module 145. As previously described, for Cisco routers, interaction is generally through a CLI. In other words, the command storage module 140 is queried through the CLI; available commands are returned through the CLI; and new configuration commands are provided to the router 120 through the CLI. Unfortunately, the CLI is difficult to manage and requires highly skilled engineers for even simple tasks.

For other routers, the configuration interface 130 could be, for example, XML based. Although the XML-based interface is easier to navigate than a CLI, each network device manufacturer that uses an XML-based interface generally structures its interface in a proprietary fashion. Thus, network engineers are still forced to learn many different interfaces and command structures even for XML-based network devices.

Figure 3:
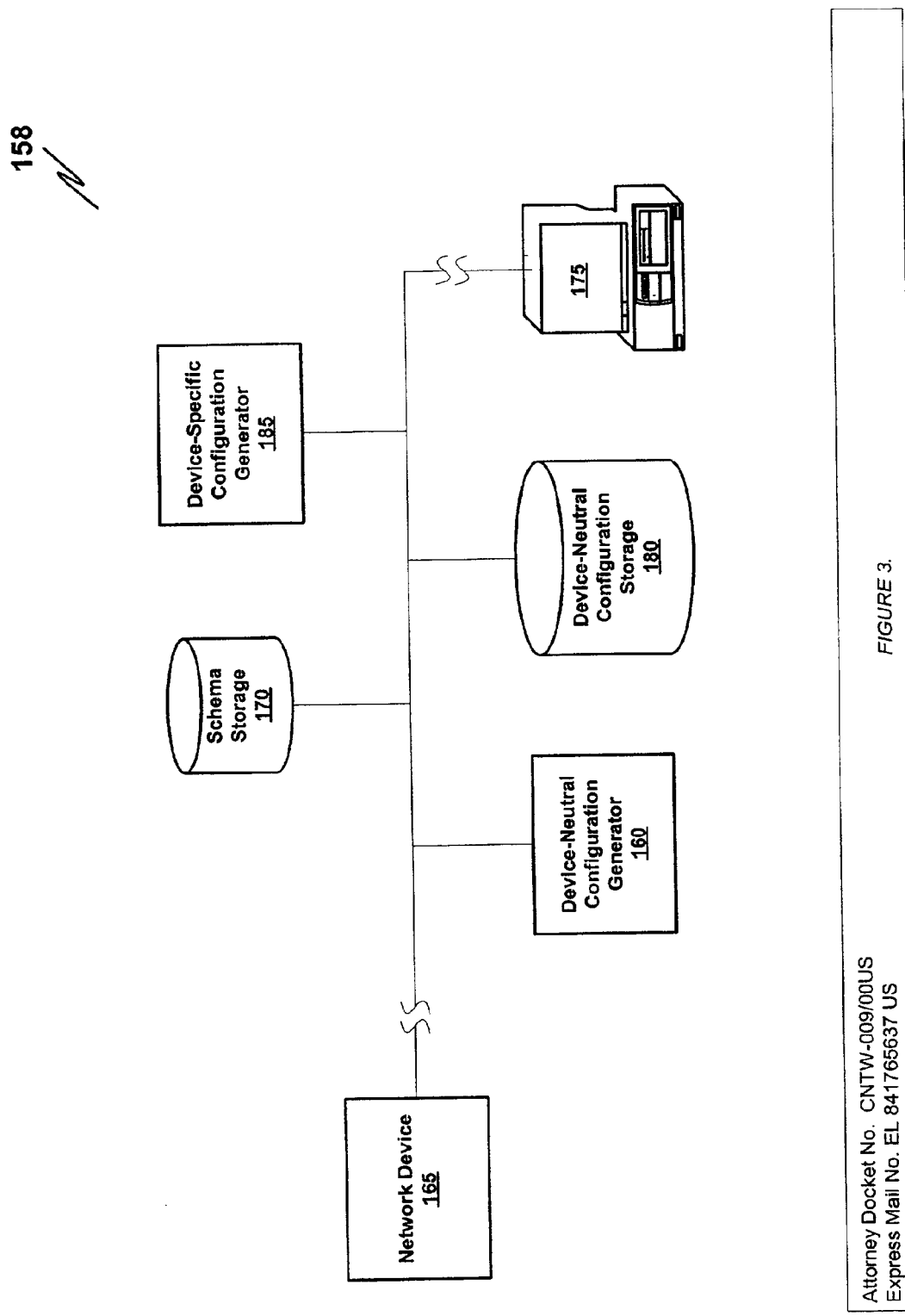
FIG. 3 is a block diagram of one embodiment of a system constructed in accordance with the principles of the present invention.

Referring now to FIG. 3, it is a block diagram of one embodiment of a system 158 constructed in accordance with the principles of the present invention. In this embodiment, a device-neutral configuration generator 160, which is more fully described in the '833 Application, is connected to a network device 165, a schema storage device 170, a system administrator 175, a device-neutral configuration storage device 180, and a device-specific configuration generator 185, which will be discussed in more detail below.

In one method of operation, the system administrator 175 can initially notify the device-neutral configuration generator 160 to model the configuration for the network device 165. For example, the device-neutral configuration generator 160 can be instructed to convert the active command format for the network device 165, e.g., CLI or XML commands, into an XML and/or DOM format. In response, the device-neutral configuration generator 160 can either poll the network device 165 to discover the device's characteristics, e.g., manufacturer, model, operating system version, etc., or retrieve the information from a database (not shown). Next, the device-neutral configuration generator 160 identifies and retrieves, from the schema storage device 170, the schema corresponding to the device characteristics for the network device 165. The schema and its creation are described in commonly owned and assigned application Ser. No. 09/942,834, entitled System and Method for Generating a Configuration Schema. Briefly, however, the schema can include a device-neutral representation of the configuration commands available to a particular class of network devices. For example, a schema could include an XML representation of the command line interface (CLI) commands available to a Cisco router of a particular model and with a particular OS. One example of a schema portion is shown in Appendix A.

After the schema is retrieved, the device-neutral configuration generator 160 can then retrieve the device-specific configuration from the network device 165 and, using the retrieved schema, convert the individual commands of the configuration into a device-neutral format such as a DOM. The resulting device-neutral format can then be stored in the device-neutral storage device 180 in association with an identifier for the network device 165. Note that storage devices 170 and 180 could, in fact, be integrated into a single device.

One advantage of the DOM format, or any other device-neutral format, is that it provides a standard format for most network device configurations. Generally, applications that use or manipulate network device configurations must be customized for each manufacturer, each model, and/or each OS version. This type of customization often requires many different versions of the same application. By converting each network device's configuration into, for example, a DOM format, however, applications can be designed to utilize a single, standard configuration format and thereby limit the need for these costly customizations.

One exemplary benefit of a device-neutral configuration format is that a system administrator 175 can easily change a configuration for any type/class of device through a familiar interface. That is, the system administrator 175 is not required to be intimately familiar with the configuration formats required for each type, model, and version of network device. With the proper interfaces, for example, the present invention can generate a Cisco CLI command from an XML document, data added to GUI text boxes, selections from drop-down menus, etc.

In one embodiment, the device-specific configuration generator 185 generates device-specific commands from device-neutral code by locating material in the schema that corresponds to the device-neutral code that is being converted. The material in the schema generally provides enough information to determine the number of device-specific commands that should be generated for the corresponding piece of device-neutral code and enough information to convert the device-neutral code to the appropriate device-specific commands. Once converted, the device-specific commands can be delivered to the network device 165. This entire process is described in more detail with regard to FIG. 4.

Figure 4:
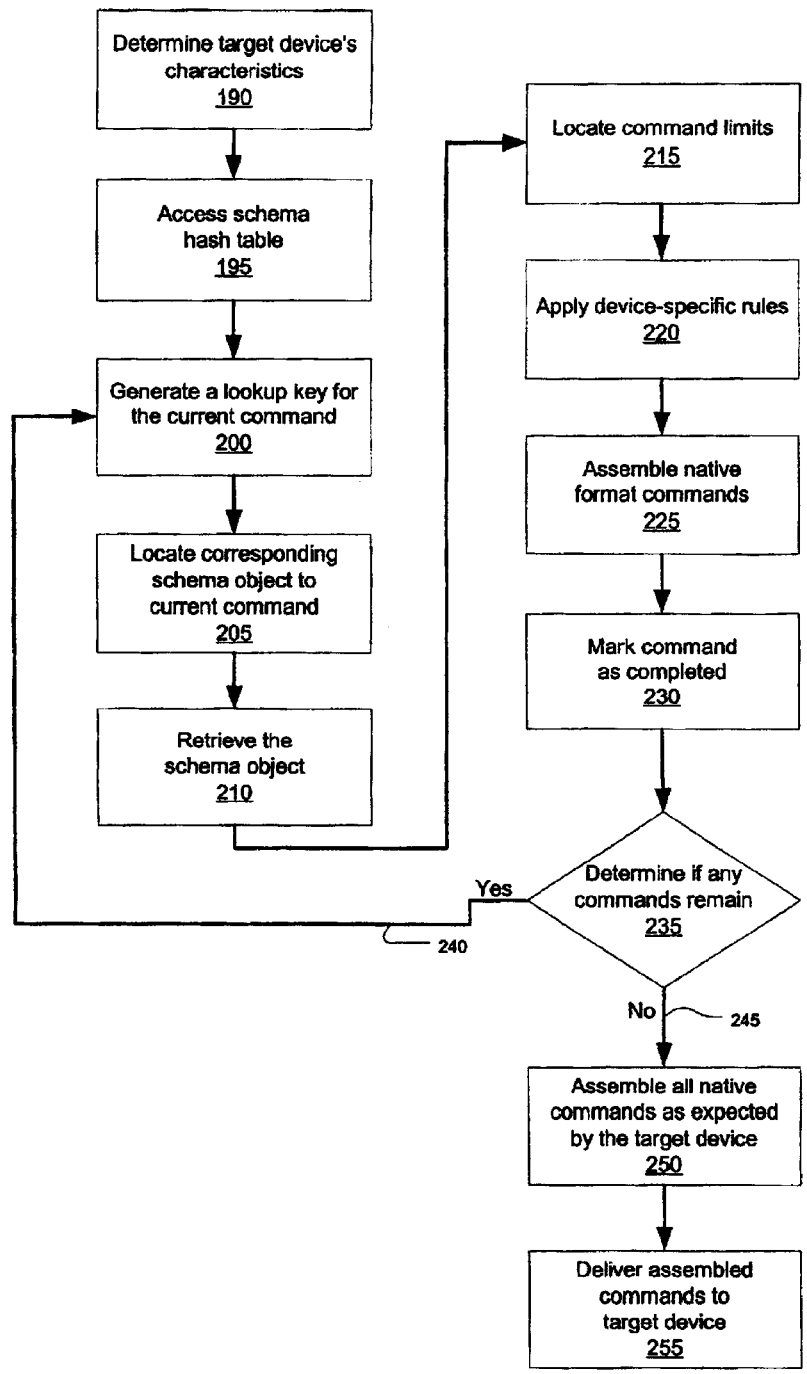
FIG. 4 is a flowchart of one method for operating the device-specific configuration generator shown in FIG. 3.

Referring now to FIG. 4, it is a flowchart of one method for operating the system shown in FIG. 3. Initially, the system administrator modifies, adds, or deletes a device-neutral configuration command for the network device. Alternatively, the system administrator could create an entirely new configuration for a newly-added network device. For the purposes of FIG. 4, however, assume that the system administrator is modifying an existing device-neutral configuration.

The modifications to the device's configuration can be stored in device-neutral configuration storage 180 in association with the appropriate record. An example snippet of an XML configuration that has been changed is shown in Example 1. This method of recording changes is referred to as Delta XML. In Example 1, comments regarding modifications to the configuration are shown in bold. Methods for recording changes other than those shown in Example 1 are also acceptable.

EXAMPLE 1

Delta XML

```
<username deltaxml:delta="WFmodify">
    <ARG.001deltaxml:delta="WFmodify">
        <deltaxml:PCDATAmodify>
            <deltaxml:PCDATAold>foo</
            deltaxml:PCDATAold>
            <deltaxml:PCDATAnew>sanjiv</
            deltaxml:PCDATAnew>
        </deltaxml:PCDATAmodify>
    </ARG.001>
    <access-class deltaxml:delta="unchanged">
        <ARG.001>1</ARG.001>
    </access-class>
    <privilege deltaxml:delta="unchanged"/>
        <ARG.001>7</ARG.001>
    </privilege>
    <noescape deltaxml:delta="unchanged"/>
    <nohangup deltaxml:delta="unchanged"/>
    <dnis deltaxml:delta="unchanged"/>
    <password deltaxml:delta="WFmodify">
        <ARG.001 deltaxml:delta="WFmodify">
            <deltaxml:PCDATAmodify>
                <deltaxml:PCDATAold>0</
                deltaxml:PCDATAold>
                <deltaxml:PCDATAnew>3</
                deltaxml:PCDATAnew>
            </deltaxml:PCDATAmodify>
        </ARG.001>
        <ARG.002 deltaxml:delta="unchanged">
    </password>
    <callback-rot deltaxml:delta="unchanged".
        <ARG.001>99</ARG.001>
    </callback-rot>
</username>
```

When the system administrator is ready to actually configure the target network device, i.e., generate device-specific commands from device-neutral code, the target device's characteristics should be discovered and used to access the schema or a representation thereof (step 190). For example, the system could determine that the target network device is a Juniper M40 router running JUNOS 4.4 software. Using that information, the schema for this class of device could be accessed (step 195).

In one embodiment, a lookup key for the device-neutral code being converted can be generated (step 200). This lookup key can be used to access a reduced representation of the schema such as a schema hash. Using the lookup key to index the schema hash, objects corresponding to pieces of the device-neutral code can be identified and retrieved (steps 205 and 210). These objects can include, in one embodiment, information that could otherwise be found in the full schema. Such information could include root commands, sibling commands, parent commands, child commands, optional containers, required containers, data types, etc.

Using the information from the retrieved objects, the device-neutral code can be parsed into portions representing device-specific commands (step 215). One technique for parsing the device-neutral code involves a forward lookup with the schema. The schema contains certain information as to what type of container(s) contain the device-neutral configuration elements, whether the container(s) is optional, the types of ancestor containers, etc. The forward lookup process uses this schema information along with a set of device-specific rules to determine where one command ends and another begins. For example, the conversion process parses the device-neutral code and breaks down the commands into the device-specific commands while applying the device-specific rules to guarantee that changes made to the device-neutral configuration are reflected in the generated device-specific commands.

Once the device-neutral code has been parsed, the individual device-specific commands can be assembled (step 225). For example, Example 2 illustrates an XML snippet of a device-neutral configuration. The conversion of this short piece of device-neutral code results in two CLI commands. The conversion of the device-neutral configuration snippet of Example 3, however, results in only one CLI command.

EXAMPLE 2

XML Snippet and Resulting Commands

```
<service>
    <timestamps>
        <debug>
            <uptime/>
        </debug>
        <log>
            <uptime/>
        </log>
    </timestamps>
</service>
```

Resulting CLI Commands 1) service timestamps debug uptime
2) service timestamps log uptime

EXAMPLE 3

XML Snippet and Resulting Commands

```
<username>
    <ARG.001>foo</ARG.001>
    <access-class>
        <ARG.001>1</ARG.001>
```

```
    </access-class>
    <privilege>
        <ARG.001>7</ARG.001>
    </privilege>
    <noescape/>
    <nohangup/>
    <dnis/>
    <password>
        <ARG.001>0</ARG.001>
        <ARG.002>test</ARG.002>
    </password>
    <callback-rot>
        <ARG.001>99</ARG.001>
    <callback-rot>
<username>
```

Resulting CLI Command 1) username foo access-class 1 privilege 7 noescape nohangup dnis password 0 test callback-rot 99

As discussed above, modifications to the device-neutral configuration can be stored as a representation of the differences between the original and the modified configurations. Example 1 shows a Delta XML version of such a representation. When a configuration is stored in such a fashion, the modifications can be identified and extracted. Based upon device-specific rules and upon the corresponding schema information, device-specific commands can be generated from a Delta XML. Example 4 shows the device-specific commands that can be generated from the Delta XML shown in Example 1.

EXAMPLE 4

Resulting CLI from Delta XML in Example 1

1) no username foo access-class 1 privilege 7 noescape nohangup dnis password 0 test callback-rot 99

2) username sanjiv access-class 1 privilege 7 noescape nohangup dnis password 3 test callback-rot 99

In one embodiment, a copy of the relevant device-neutral configuration code can be created. This copy can then be modified to reflect that a particular portion of the device-neutral code has been converted (step 230). For example, markers can be inserted into the code to reflect that a particular portion of the code has been converted. With regard to the snippet shown in Example 2, which is reproduced as Example 5, the first pass, labeled as "Pass 1," over the code would result in the CLI command "service timestamps debug uptime." After the "uptime" command, a marker could be placed. On the next pass, labeled as "Pass 2," the resulting code would be "service timestamps log uptime." Because the first pass had already processed the "debug" level, the second pass skipped to the next sibling level, which is "log," and completed assembling the device-specific instruction. Example 5 is only an illustration of a portion of the multi-step process for generating device-specific commands. Generally, the number of passes in the process (only two are illustrated) is a function of the number of commands within a parent element, e.g., <service> in Example 5. Additionally, this process is also done in conjunction with the forward lookup process described herein.

EXAMPLE 5

XML Snippet and Resulting Commands

```
           ⎧  ⎧ <service>
           ⎪  ⎪   <timestamps>
     Pass 1⎨  ⎨     <debug>
           ⎪  ⎪       <uptime/>
Pass 2 ⎨   ⎩  ⎩     </debug>      ← [End Pass 1]
       ⎪        <log>
       ⎪          <uptime/>
       ⎪        </log>
       ⎪      </timestamps>
       ⎩    </service>
```

After the current piece of device-specific code has been converted, a determination is made as to whether any device-neutral code remains to be converted to the device-specific format (step 235). If any code remains to be converted, yes branch 240 is followed, the next portion of code is selected, and the conversion process is restarted from step 200. Otherwise, the no branch 245 is followed and the generated device-specific commands are assembled in the order and form expected by the target device and then delivered to the target device (steps 250 and 255). The target device can store these new commands locally, for example, in configuration storage 145 (shown in FIG. 2.)

Although the above embodiments are generally described with regard to XML to non-XML formats, embodiments of the present invention can convert device-neutral XML configurations to device-specific XML commands. In this embodiment, device-specific configuration generator 185 parses the device-neutral configuration code and alters the XML in such a way that the resulting XML conforms to the target network device's native language. For example, assuming that a Delta XML, or something similar, is used to indicate changes to the device-neutral configuration code, this type of XML-to-XML conversion can involve parsing through the device neutral configuration code; cleaning the Delta XML version of add, delete, and modify indicators; and inserting new XML elements and attributes as indicated by the Delta XML. Additionally, the conversion process can confirm the device-specific format of the XML commands.

Figure 5:
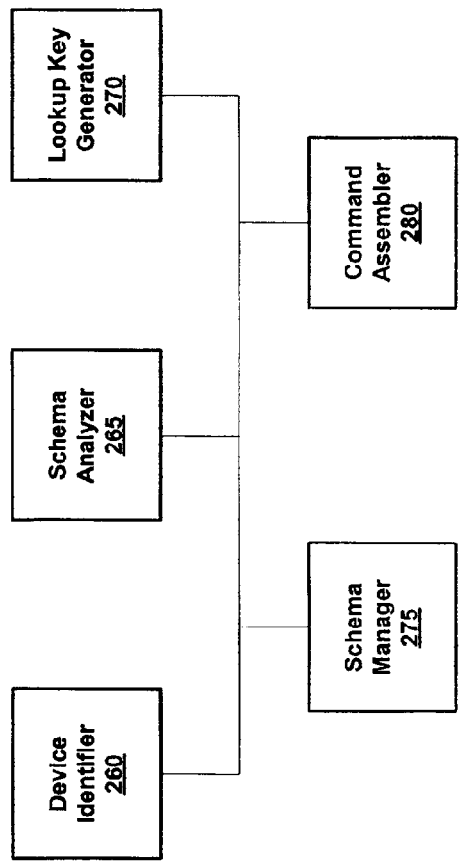
FIG. 5 is a block diagram of one implementation of device-specific configuration generator shown in FIG. 3.

Referring now to FIG. 5, it is a block diagram of one embodiment for implementing the device-specific configuration generator 185 shown in FIG. 3. This implementation includes a device identifier 260, a schema analyzer 265, a lookup key generator 270, a schema manager 275, and a command assembler 280.

The device identifier 260 can determine a target device's characteristics. The device identifier, for example, may poll the target device, which may or may not be a network device, to discover this information, or it may retrieve the information from a database. Based upon the identity of the target device, the schema analyzer 265 can locate the device-specific configuration for the target device and parse that device-neutral configuration to locate the commands that have been modified.

Using information developed by the device identifier 260, the lookup key generator 270 can parse the device-neutral configuration code, or at least the changes identified by the schema analyzer 265, and generate a lookup key to access the schema or a corresponding schema hash table. The schema manager 275 can retrieve the relevant portions of the schema and/or corresponding schema objects based upon the lookup key. Moreover, the schema manager 275 can create copies of the schema/objects and modify those copies to reflect that the conversion has been completed. Finally, the command assembler 280 can assemble the device-specific commands and deliver them to the target device. In some embodiments, a post processor orders the device-specific commands according to the device's needs and/or deletes certain material.

Those of skill in the art can recognize that the functions of the present invention can be grouped in different ways than shown. For example, these components can be included in a single processor-memory device arrangement, a single application specific integrated circuit (ASIC), multiple ASICs, a distributed general processor system, etc.

Figure 6:
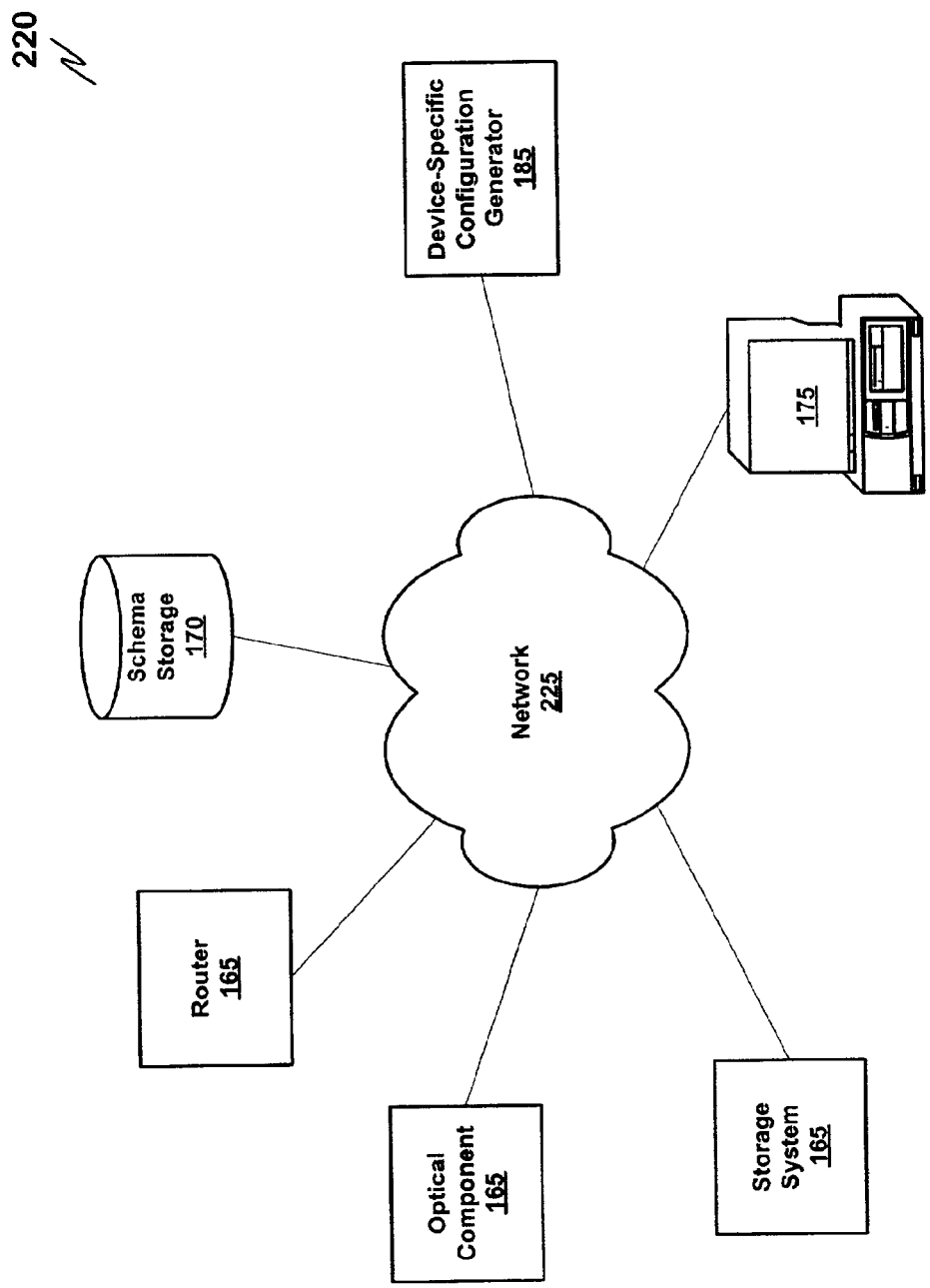
FIG. 6 is a block diagram of an alternate embodiment of a system constructed in accordance with the principles of the present invention.

Referring now to FIG. 6, it is a block diagram of an alternate embodiment of a system 220 constructed in accordance with the principles of the present invention. In this embodiment, the device-specific configuration generator 185 is connected through a network 225 to the network devices 165, the system administrator 175, and the schema storage device 170. This embodiment illustrates that the components described herein can be distributed in a number of ways and without impacting the basic operation of this system.

In conclusion, the present invention provides, among other things, a system and method for generating device-specific configuration commands from device-neutral configuration code. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for configuring a network device associated with a device-neutral configuration code, the method comprising:
   determining a characteristic for the network device;
   generating a lookup key corresponding to the device-neutral configuration code;
   identifying configuration schema material corresponding to the lookup key;
   locating a device-specific command boundary in the device-neutral configuration code using the identified configuration schema material, the device-specific command boundary indicating the boundary between a first portion of the device-neutral configuration code and a second portion of the device-neutral configuration code, wherein the first portion corresponds to a first device-specific command and the second portion corresponds to a second device-specific command;
   assembling the first device-specific command from the first portion of the device-neutral configuration code;
   assembling the second device-specific command from the second portion of the device-neutral configuration code; and
   providing the assembled device-specific command for delivery to the network device.

2. The method of claim 1, wherein determining the characteristic for the network device comprises:
   determining one of a device type, a device manufacturer, a device model, and an operating system version.

3. The method of claim 1, wherein identifying configuration schema material comprises:
indexing a schema hash table with the lookup key, the schema hash table corresponding to the determined characteristic for the network device.

4. The method of claim 3, further comprising:
retrieving a schema object corresponding to the lookup key.

5. The method of claim 4, wherein the schema object comprises:
hierarchical data about the device-neutral configuration code.

6. The method of claim 1, wherein the identified configuration schema material comprises:
an identifier for a sibling command to at least a portion of the device-neutral configuration code, wherein the sibling command is a command type available to the network device.

7. The method of claim 1, wherein the identified configuration schema material comprises:
an identifier for a parent command.

8. The method of claim 1, wherein the identified configuration schema material comprises:
an identifier for a root command.

9. The method of claim 1, wherein locating device-specific command boundaries comprises:
performing a forward lookup in the identified configuration schema material.

10. The method of claim 1 further comprising:
marking the first portion of the device-neutral configuration code as completed responsive to assembling the first device-specific command and prior to assembling the second device-specific command;
wherein the marked portion corresponds to the first portion of the device-neutral code.

11. The method of claim 1, wherein assembling the first device-specific command comprises:
applying a device-specific rule to the device-neutral configuration code prior to assembling the first device-specific command.

12. The method of claim 1, wherein the device-neutral configuration code is an original device-neutral configuration code, the method comprising:
generating a marked-up device-neutral configuration code from the original device-neutral configuration code; and
identifying the difference between the original device-neutral configuration code and the marked-up device-neutral configuration code;
wherein the assembled first device-specific command corresponds to at least a portion of the identified difference.

13. The method of claim 12, wherein the marked-up device-neutral configuration code comprises:
a Delta XML document.

14. The method of claim 1, further comprising:
identifying a change made to the device-neutral configuration code; wherein the assembled first device-specific command corresponds to the identified change.

15. The method of claim 1, further comprising:
arranging the first device-specific command and the second device specific command as expected by the network device.

16. A system for configuring a network device associated with a device-neutral configuration code, the system comprising:
at least a first processor;
at least a first memory device connected to the processor; and
a plurality of instructions stored on the at least a first memory device, the plurality of instructions configured to cause the at least a first processor to:
identify configuration schema material corresponding to the network device;
locate a device-specific command boundary in the device-neutral configuration code using the identified configuration schema material, the device-specific command boundary indicating the boundary between a first portion of the device-neutral configuration code and a second portion of the device-neutral configuration code, wherein the first portion corresponds to a first device-specific command and the second portion corresponds to a second device-specific command;
assemble the first device-specific command from the first portion of the device-neutral configuration code;
assemble the second device-specific command from the second portion of the device-neutral configuration code; and
provide the assembled device-specific command for delivery to the network device.

17. The system of claim 16, wherein the device-neutral configuration code is an original device-neutral configuration code and wherein the plurality of instructions are configured to cause the at least a first processor to:
generate a marked-up device-neutral configuration code from the original device-neutral configuration code; and
identify the difference between the original device-neutral configuration code and the marked-up device-neutral configuration code;
wherein the assembled first device-specific command corresponds to at least a portion of the identified difference.

18. The system of claim 17, wherein the plurality of in instructions are further configured to cause the at least a first processor to:
identify a change made to the device-neutral configuration code;
wherein the assembled first device-specific command corresponds to the identified change.

19. The system of claim 16, wherein the plurality of instructions are further configured to cause the at least a first processor to:
arrange the first device-specific command and the second device-specific command in an order expected by the network device.

20. A system for configuring a network device associated with a device-neutral configuration code, the system comprising:
means for identifying configuration schema material corresponding to the network device;
means for locating a device-specific command boundary in the device-neutral configuration code using the identified configuration schema material, the device-specific command boundary indicating the boundary between a first portion of the device-neutral configuration code and a second portion of the device-neutral configuration code, wherein the first portion corresponds to a first device-specific command and the second portion corresponds to a second device-specific command;

means for assembling the first device-specific command from the first portion of the device-neutral configuration code;

means for assembling the second device-specific command from the second portion of the device-neutral configuration code; and means for providing the assembled device-specific command for delivery to the network device.

21. The system of claim 20, wherein the device-neutral configuration code is an original device-neutral configuration code, the system further comprising:

means for generating a marked-up device-neutral configuration code from the original device-neutral configuration code; and means for identifying the difference between the original device-neutral configuration code and the marked-up device-neutral configuration code;

wherein the assembled first device-specific command corresponds to at least a portion of the identified difference.

* * * * *